(12) United States Patent
Rojas Zegers

(10) Patent No.: US 12,654,174 B2
(45) Date of Patent: Jun. 16, 2026

(54) SYSTEM FOR SEPARATING LIQUIDS AND SOLIDS

(71) Applicant: Saving Solutions S.p.A., Santiago (CL)

(72) Inventor: Gerardo Rojas Zegers, Santiago (CL)

(73) Assignee: Saving Solutions S.p.A., Santiago (CL)

( * ) Notice: Subject to any disclaimer, the term of this patent is extended or adjusted under 35 U.S.C. 154(b) by 999 days.

(21) Appl. No.: 17/772,502

(22) PCT Filed: Oct. 22, 2020

(86) PCT No.: PCT/CL2020/050140
§ 371 (c)(1),
(2) Date: Apr. 27, 2022

(87) PCT Pub. No.: WO2021/081681
PCT Pub. Date: May 6, 2021

(65) Prior Publication Data
US 2022/0371028 A1 Nov. 24, 2022

(30) Foreign Application Priority Data
Oct. 29, 2019 (CL) ..................................... 31192019

(51) Int. Cl.
*B03C 5/02* (2006.01)
*B01D 57/02* (2006.01)
(52) U.S. Cl.
CPC ................ *B03C 5/02* (2013.01); *B01D 57/02* (2013.01)
(58) Field of Classification Search
CPC .......... C02F 1/46–1/4698; B01D 59/38–59/42
See application file for complete search history.

(56) References Cited

U.S. PATENT DOCUMENTS

| 4,131,526 A | 12/1978 | Moeglich |
| 6,139,717 A | 10/2000 | Hayakawa |
| (Continued) |

FOREIGN PATENT DOCUMENTS

| CN | 1324769 A | 12/2001 |
| CN | 101085683 | 11/2010 |
| (Continued) |

OTHER PUBLICATIONS

International Preliminary Report on Patentability, Chapter II, in International Appln. No. PCT/CL2020/050140, dated Jul. 20, 2021, 48 pages (with English translation).

(Continued)

*Primary Examiner* — Alexander W Keeling
(74) *Attorney, Agent, or Firm* — Fish & Richardson P.C.

(57) ABSTRACT

This development corresponds to a system with electronic components for the treatment of high-concentration fluids or solutions or suspensions with solutes, such as wastewater treatment, obtaining valuable elements that are part of a fluid, seawater desalination, among other processes. The system comprises electrodes, tank, solid-state electronic device, a system management algorithm, and an optional solids removal device. This development also intends to protect a fluid or solution treatment procedure that generally involves two joint or sequential stages, whereby a dynamic electro-coagulation takes places first, followed by dynamic electro-flocculation, in order to separate liquids from dissolved solids or solutes from a solution.

7 Claims, 9 Drawing Sheets

(56)                    References Cited

U.S. PATENT DOCUMENTS

| | | | |
|---|---|---|---|
| 6,358,398 B1 | 3/2002 | Halldorson et al. | |
| 10,545,088 B2 * | 1/2020 | Ormeci Beckers .... | G01N 21/33 |
| 2008/0185293 A1 * | 8/2008 | Klose ..................... | C02F 1/463 |
| | | | 205/687 |
| 2011/0155564 A1 * | 6/2011 | Oifman .............. | B01D 21/0039 |
| | | | 210/255 |
| 2013/0180857 A1 | 7/2013 | Heffernan et al. | |
| 2014/0116942 A1 * | 5/2014 | Gordon .................. | C02F 1/463 |
| | | | 210/201 |
| 2015/0066383 A1 | 3/2015 | Wernicke | |
| 2015/0166383 A1 | 6/2015 | Visnja et al. | |
| 2017/0015570 A1 * | 1/2017 | Ritchie .................. | C02F 1/463 |
| 2018/0186671 A1 * | 7/2018 | Perez ..................... | C02F 1/008 |
| 2019/0023589 A1 * | 1/2019 | Norman ................. | C02F 1/465 |

FOREIGN PATENT DOCUMENTS

| | | |
|---|---|---|
| CN | 203938560 | 11/2014 |
| CN | 104071930 | 12/2015 |
| KR | 10-2014-0047476 A | 4/2014 |
| RU | 2008112628 | 10/2009 |
| WO | WO 2006121976 | 11/2006 |
| WO | WO-2006121976 A2 * | 11/2006 ........... C02F 1/4672 |
| WO | WO 2008062171 | 5/2008 |
| WO | WO 2011010275 A1 | 1/2011 |

OTHER PUBLICATIONS

International Search Report in International Appln. No. PCT/CL2020/050140, dated Feb. 16, 2021, 5 pages (with English translation).

Extended European Search Report in European Appln. No. 20880955.8, mailed on Nov. 13, 2023, 16 pages.

Office Action in Chinese Appln. No. 202080077655.2, mailed on May 25, 2023, 9 pages (with English translation).

Office Action in Israeli Appln. No. 292425, mailed on Jul. 16, 2024, 4 pages.

Office Action in United Kingdom Appln. No. GB2207802.6, mailed on Dec. 1, 2023, 7 pages.

Office Action in United Kingdom Appln. No. GB2207802.6, mailed on Oct. 21, 2024, 4 pages.

Search Report in Chilean Appln. No. 201903119, mailed on Feb. 19, 2021, 7 pages (with English translation).

* cited by examiner

SYSTEM FOR SEPARATING LIQUIDS AND SOLIDS

The annexed Computer Program Listing Appendix in text file is incorporated herein by reference in its entirety.

FIELD OF APPLICATION

This system's field of application includes industrial applications for separating liquids and dissolved solids or liquids with solutes from a solution. Some applications of this technology include industrial water treatment, industrial liquid waste treatment, mining operations liquid treatment (such as electrolytes), agricultural water treatment, seawater treatment for the desalination process, tailings dam treatment for water recovery, settling pond treatment, brackish pond treatment, and brine treatment (such as the lithium carbonate purification process), among others.

It should be mentioned that the only condition required of liquids in order to be treated by this technology is that they must have a minimum conductivity of 2 mS/m or more, which is the case in practically all of the above-mentioned cases.

DESCRIPTION OF THE PRIOR ART

Overall, the state of the art refers specifically to several patents that protect not a particular physical system but a set of devices and methods that enable a particular functionality.

There are a number of documents that fall within the general field of liquid waste treatment, with decreases in typical pollution parameters such as BOD5, COD, TSS, fluoride ion removal, among others, through the use of coagulants or flocculants such as aluminum hydroxide or aluminum dioxide, and also through electromagnetic field generation created by a titanium cell coated with mixed oxides, as presented in document WO 2008062171.

On the other hand, there is application CN203938560, which mentions a utility model referring to a domestic wastewater treatment system for a ship. The system consists of a wastewater storage tank, a grinding pump, a biochemical reaction device, an electrical flocculation treatment device, a membrane filter, a waste return slot, an incinerator, an electrocatalytic disinfection device, and a power supply control device.

There is also Document US201566383, which shows an industrial and/or potable wastewater treatment process and plant through electrochemical methods and advanced oxidation processes, where the main treatment consists of electro-coagulation, electro-oxidation, and electro-flotation through the action of stainless steel, steel, and aluminum metal electrode sets, respectively, with parallel disinfection/oxidation by ozone, UV irradiation, and ultrasonic treatment, as well as recirculation in the electromagnetic field.

In addition, there is document U.S. Pat. No. 6,358,398, which points to a method for separating pollutants from an aqueous source containing pollutants. The method uses a dissolved, highly oxidizing powder in the aqueous system, where the method can be enhanced by electro-coagulation. This involves the use of an electrical cell that is disposed of inside the tank containing the oxidizing material.

Likewise, there is document RU2008112628, wherein the invention relates to devices for the electrochemical purification of water that can be used in the home for the post-treatment of tap water, as well as for the purification of natural water and the provision of physical and chemical, sanitary, and organoleptic properties for drinking water needs. The device aims at electrochemical water purification.

Finally, there is document U.S. Pat. No. 6,139,717, which defines a process and device for treating water. The device has a grounding electrode and a pair of application electrodes connected to a DC voltage source through a register and first and second high frequency switches controlled by a high frequency switching circuit to convert the DC voltage from the DC voltage source to AC voltage to be fed to the application electrodes. The high frequency switching circuit of the command swich is connected to a first high frequency oscillation circuit connected to a control circuit which is controlled by a second high frequency oscillation circuit to provide a signal randomly changing in frequency as an output signal from the first high frequency oscillation circuit. The second high-frequency oscillation circuit also controls a flip-flop circuit connected to the first high-frequency oscillation circuit to add sharp, momentary frequency fluctuation portions into the random frequency change signal of the first oscillation circuit.

In general, the entire state of the art is based on applied electro-coagulation and electro-flocculation processes for river and lake waters, where specific grounded electrodes with low structural life were tested.

TECHNICAL PROBLEMS RESOLVED BY THIS INVENTION

The technical problems that this system intends to solve are based on:

Being able to separate liquids with dissolved solids with a minimum of conductivity using frequencies in the VLF band.

Being able to separate solids suspended in a fluid using frequencies in the VLF band.

Being able to perform electro-coagulation and dynamic electro-flocculation without requiring grounded electrodes to close the circuit and allow current circulation, nor their use as current returns to operate the system of this development.

Being able to treat different types of fluids with a single system that adapts to different fluid conditions, so it can be used to treat industrial waters, for seawater desalination for industrial and human consumption, in tailings dam, settling ponds, brackish pond water recovery systems, for liquid recovery in electro-deposition processes, in brines for metal extraction and purification processes (lithium, potassium, sodium, among others), for the treatment of liquid industrial wastes, among others.

A system that uses fewer man hours, less physical space, and less energy consumption, between 20% and 25%, than similar water filtration plants or processes, such as reverse osmosis plants.

Development Overview

This development corresponds to a resonance separation system for liquids and solids comprising conductive electrodes (12) that produce electro-coagulation and electro-flocculation phenomena inside an electrically insulated tank where the fluid to be separated is placed. In addition, the system includes the connections of the conductive electrodes to a PCB (Printed Circuit Board), which in turn comprises microcontrollers, an electrical connection, and its operating algorithms, as well as AC/DC power supplies that provide the energy required for the control and separation process.

On the other hand, the present development also comprises a method for operating the aforementioned system, where:

Pre-evaluation of the liquid: the liquid to be separated is electrochemically evaluated beforehand, where a minimum conductivity of 2 mS/m of the liquid to be separated is required. On the other hand, to identify the type of electrodes to be used, the pH can be measured to determine the acidity of the liquid. For example, if the liquid contains acids, a change of electrodes to titanium electrodes coated with Tantalum, Ruthenium, or other conductive material is required.

Resonance separation: With the above information, a suitable frequency program for the electrodes is selected and the conductive electrodes are immersed and activated in the very low frequency (VLF) range, generating a physical change that separates the liquid from the precipitate, leaving it in a condition of indissolubility through the phenomena of electro-flocculation and electro-coagulation (solubility phase change). The activation of the electrodes leads to the generation of 6 specific duty cycles designed for each of the frequencies used, with the system generating energy pulses of less than 2 milliseconds within one duty cycle.

Resonance feedback: By measuring the temperature of the liquid and the current in the liquid, the duty cycle frequency parameters are adjusted.

Electrode flushing: There is another stage involving frequency inversion in order to better maintain the electrodes used. (It is used at the end of the process and in intermediate stages of the process).

Physical Separation: After the resonance separation stages, 3 phases are produced in the tank, flocculated solids on the surface, precipitated solids at the base of the tank, and "clean" liquid in the middle. The flocculated solids are separated by mechanical surface entrainment or overflow, the precipitated solids by decantation, and the liquid from the medium is recovered for reuse.

It must be stated that this invention is not limited to the particular methodology, compounds, materials, manufacturing techniques, uses, and applications described herein, as these may vary. It should also be understood that the terminology employed herein is used for the sole purpose of describing a particular embodiment, and is not intended to limit the perspective and potential of this invention.

It should be noted that in the use and method, here, in the statement of claims and throughout the text, the singular does not exclude the plural, unless the context clearly implies so. So, for example, the reference to a "use or method" is a reference to one or more uses or methods and includes equivalents known to those familiar with the subject matter (the art). Similarly, as a further example, the reference to "a step", "a stage" or "a mode" is a reference to one or more steps, stages, or modes and may include implied and/or upcoming sub-steps, stages, or modes.

All conjunctions used should be understood in the least restrictive and most inclusive sense possible. Thus, for example, the conjunction "or" should be understood in its orthodox logical sense, and not as an "or excluding", unless the context or the text expressly requires or indicates it. The structures, materials, and/or elements described must be understood to also refer to those functionally equivalent in order to avoid endless, exhaustive enumerations.

Expressions used to indicate approximations or conceptualizations should be understood as such, unless the context dictates a different interpretation.

All technical and/or scientific names and terms used herein have the common meaning given to them by an ordinary person qualified in these matters, unless expressly indicated otherwise.

Methods, techniques, elements, compounds, and compositions are described, although similar and/or equivalent methods, techniques, compounds, and compositions to those described may be used or preferred in practice and/or when testing this invention.

All patents and other publications are incorporated as references, for the purpose of describing and/or reporting, for example, methodologies described in such publications, which may be useful in connection with this invention.

These publications are included only for the information they contain prior to the filing date of this patent application.

Nothing in this regard should be considered an admission or acceptance, rejection or exclusion, of the entitlement of the authors/inventors to be considered as such, or of such publications being backdated pursuant to previous ones, or for any other reason.

In order to provide clarity to the present development, the following concepts will be defined:

Conductive electrode: An electrode is an electrical conductor made of materials that allow current to flow through them, used to make contact with a non-metallic part of a circuit. On the other hand, the conductive level electrodes come into contact with a conductive liquid, where a small alternating current begins to flow. The present development uses conductive electrodes from the aluminum, titanium, stainless steel, ruthenium, tantalum, or other conductive material group, preferably aluminum or electrodes coated with, for example, a titanium core coated with tantalum.

Electro-flocculation: Agglutination of colloidal substances present in a solution, thus facilitating their decantation and subsequent filtration resulting from the delivery of electrical energy to a solution.

Electro-coagulation: Generation of electrical charges on particles or solids dissolved in a solution by delivering electrical energy to this solution in order to generate the conditions for these particles or solids to electrically group together.

Duty Cycle: It is the ratio between the time the signal is in active state and the maintenance period of the same signal.

Frequency: Frequency is a magnitude that measures the number of repetitions an event can have per unit of time.

VLF: Very low frequencies whose wavelength is very large, in the range from 1 Hz to 250 Hz, and their corresponding even subharmonics.

DSP: Digital signal processor.

Electronic Microcontroller: A microcontroller is an integrated circuit that contains a central processing unit (CPU), memory units (RAM and ROM), input and output ports and peripherals, such as the PIC16F87X Microchip® family PIC16F876X, PIC16F877X, PIC16F873X, PIC16F874X, or with similar capabilities, among others.

DETAILED DESCRIPTION OF THE INVENTION

The system comprises four interacting parts: the electrodes; the controller; the operating algorithm; a tank; and optionally a floc and precipitate extraction device.

The abovementioned electrodes range in number from a single pair of electrodes to a number of electrodes meeting the ratio of 0.25 m² of electrode per m³ of tank capacity, preferably 2 conductive electrodes. Conductive electrodes are defined as electrical conductors used to make contact with a non-metallic part of an aqueous solution, which are made of metallic, ceramic composite, or polymeric conductive materials, preferably aluminum, and have a surface area in the range of 0.01 to 2 m². The electrodes should be positioned at a height of between 5 cm to 25 cm from the base of the container, preferably 10 cm, and at a distance from the container walls of between 10 cm to 50 cm, preferably 40 cm. The electrodes are connected to a solid-state electronic device, which comprises:

A. Control Module with Microcontroller and Peripherals (1):

This module comprises an integrated control element that is equipped with a microcontroller and peripheral elements (input and output ports, (8 bits or more) analog-to-digital converters, digital-to-analog converters, and internal oscillator outputs, among others). This module stores all the mathematical control programs and algorithms, the generation of the different oscillator frequencies, the different duty cycles and the system operating conditions. The way it works is by receiving power from the power supply (6) and the voltage adaptive programming module (2).

The module is characterized by receiving frequency and duty cycle operation information from the voltage adaptive programming module (2) and generating the trigger control signals to be used by the power module (3).

B. Battery-Backed Power Supply Module (6):

This module has an energy transformation element, a rectifier, which is in charge of transforming the alternating current into direct current and also has a distribution system of the same current, which allows supplying the energy required by the control module (1), and all the rest of the modules.

It includes a power backup system (9) to keep critical parameters under control at all times and permanently monitored, even in the event of a power supply voltage variation or total absence of power.

C. Voltage Adaptation and Programming Module (2):

This module has two key functions. The first is to externally program the different operating modes without the need to access the PIC microcontroller.

This function can be performed by accessing the integrated programming switches (mini Dips) included in this module. To this end, the equipment has an element that, when activated, generates a command response specially designed for this purpose.

The second function incorporated in this module consists of adapting the voltages required by the microcontroller for its correct operation. Finally, it is the module in charge of supplying the trigger signals to the power module (3).

D. Power Module (3):

This module has the specific function to directly feed the conductive electrodes (12). It consists of at least four independent channels (13) mounted on a terminal strip (5) whose signals are isolated from the integrated control element (1).

This is done successfully, since the power module (3) has an optical isolation function through opto-couplers.

Each channel has a set of high-power transistors that are activated by the signals generated by the integrated control element (1) and adapted by the programming and voltage adaptation module (2).

The working algorithm, considering frequency inversion, operates under 6 basic processes that are integrated and related to each other, which are called mode 10, mode 20, mode 30, mode 40, mode 50, and mode 60. On the other hand, the system has the capacity to perform a frequency inversion in order to "flush" the electrodes and thus increase their useful life.

The working algorithm, which is able to send the different working modes to the electrodes, achieves a phenomenon called molecular resonance on the suspended solids or dissolved solids of the liquid to be treated, causing these solids to modify their structure, thus achieving their separation. This phenomenon is also called dynamic electro-flocculation or dynamic electro-coagulation. Another phenomenon that occurs in resonance separation is the generation of bubbles by the electrodes, which helps the movement of electro-flocculated or electro-coagulated solids to the tank surface.

The system further comprises one or more containers or treatment tanks, non-metallic, preferably plastic, epoxy resins, fiberglass, suitable to support a liquid volume from 0.1 cubic meters to 1 million cubic meters, to be processed in Bach form, without excluding continuous treatment. Containers can be cylindrical, rectangular, conical with decanters, irregular shapes to suit the terrain where they are placed, preferably cylindrical, among others. The tank also comprises inlets and outlets for the liquid to be treated, foam outlets, solids outlet, and optionally a surface floc removal device (16).

The system can also optionally include devices to separate the flocs from the surface, among which we can mention paddle separators, rotary separators, overflow separators, although for this development we will preferably use paddle separators.

In general, this development is based on the use of frequencies operating in the VLF (Very Low Frequency) band, between 1 Hz and 250 Hz, and their corresponding even subharmonics, where the effects related to the resonance phenomenon are mainly exploited. Thus, by being able to make the solids dissolved in a liquid "resonate", the structural threshold of its composition is exceeded, transforming crystalline structures into amorphous structures. Thus, as the structural bond is modified, it is separated from the liquid and precipitates, usually in a condition of indissolubility.

All of the above is complemented by the variation of the specific duty cycles implemented in each of the frequencies used (see FIGS. 5/9 and 6/9), which in turn are automatically fed back by process variables such as the current, producing modifications in the specific duty cycle, but preserving each specific frequency.

The algorithm is also capable of generating new processes and duty cycles in real time, according to the current and temperature measured at the conductive electrodes.

Thus, and considering the phase inversion of the frequencies used, the six different basic processes are generated as mentioned above.

This same development also includes the system operation procedure, which covers the following stages:

a) filling the container with the liquid to be separated up to a spill-proof safety edge;

b) measuring pH, temperature, and conductivity of the liquid to be separated outside the system (without precluding that they can be measured internally as part of the data feedback).

c) integrating the previously measured data into the algorithm and defining the duty cycle and modes to be applied through the microcontroller and the programming module (2) via its built-in analog and digital inputs;

d) activating the solid-state electronic device, providing frequencies in the range of 1 Hz to 250 Hz, preferably in the six system operating modes, where the different modes are assigned according to: i) the measurements of the current flowing through the electrodes, ii) the voltage applied to the electrodes, and iii) the temperature of the liquid to be separated. (As seen in FIGS. 5/9 and 6/9). The solid-state electronic device begins to sweep through the different modes, where infinitesimal current pulses are produced within each mode to break and reform the ionic and covalent bonds of the solids dissolved in the sample, thus generating larger flocs capable of being separated;

e) formation of precipitated and/or electro-coagulated solids for extraction from the target liquid;

f) formation of bubbles pushing the electro-flocculate to the surface of the tank;

g) removal of the electro-flocculated solid to the surface of the tank, leaving the clean liquid; and h) phase inversion, only with modes 1, 2, and 3, on the electrodes in order to flush them, thus increasing their service life.

To describe step d), as an example, if we take the value of 35 in the previous diagram of FIG. 5/9 as reference, we notice that there are 3 modes under this value, mode 10, mode 20, and mode 30.

In the same way, if we consider the same value 35, we notice that there are 3 modes above that value, i.e. mode 40, mode 50, and mode 60.

This configuration of modes is relevant because the mathematical algorithms can be associated and take a relative reference, differentiating the modes as "positive" or "negative" with respect to the referential value mentioned, e.g., of 35 in the mode diagram.

Thus, if we consider that each mode can have an independent duty cycle, which directly influences the power module, and this in turn influences the electrodes and ultimately the electrodes acting directly on the liquid to be separated, we can have different "polarities" associated with different frequencies and different duty cycles.

DESCRIPTION OF THE OPERATION OF THE DEVELOPED SYSTEM

The liquid or solution to be treated enters the treatment tank (14), through the inlet area of the liquid to be treated (32).

Once the liquid has reached the level of the conductive electrodes (12), the solid-state electronic device (15) begins to perform the first operating sequences with the preset modes (FIG. 5/9), taking the reference currents provided by the same conductive electrodes (12) through the programming status of the mini dips (24) and their connectors (30).

The conductive electrodes (12) receive the energy provided by the power transistors (17) through their power output terminals (18), whose signals and voltage levels are adapted and activated by the driver command conductor transistors (20). This is done once the microcontroller (1) triggers the programming signal through its pushbutton (29) and the voltage regulators (26) are activated.

Thus, the microcontroller (1) measures and analyzes the operating parameters such as the different modes and duty cycles, and starts the treatment process, following the control algorithms (which are described in the following paragraph). Once some time has elapsed (approximately 10 minutes) and the level of the liquid to be treated has reached its maximum level, the foam generated by the treatment itself (dynamic flocculation) is extracted from the treatment tank (14) through the foam outlet area (31).

At the end of the desired treatment time, the treated liquid free of solids (dynamic coagulation and precipitation) is extracted from the tank's treated liquid outlet area (31).

Likewise, the precipitated solids are extracted through the solids outlet area (34) specially provided for this purpose.

As described above, the electrodes are separated by plastic pins and spacers (35) and adjusted by plastic nuts (36) made of non-conductive material.

Figure 1:
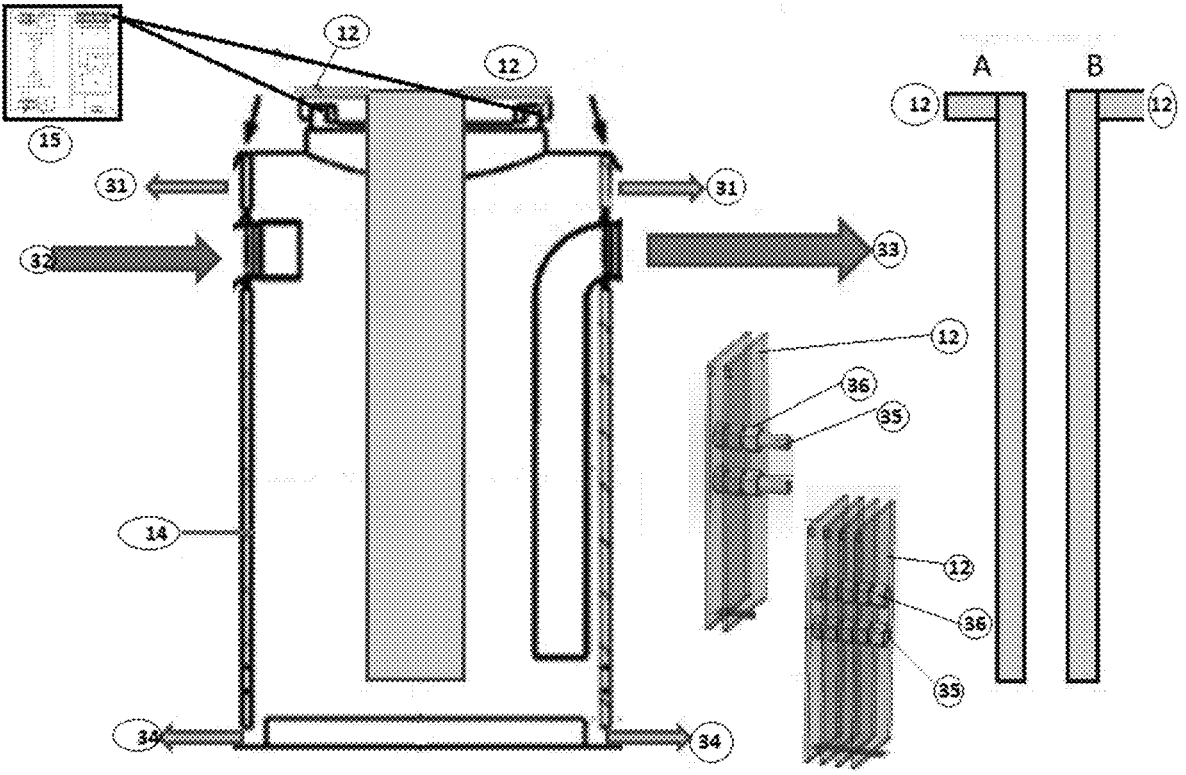
FIG. 1
Figure 2:
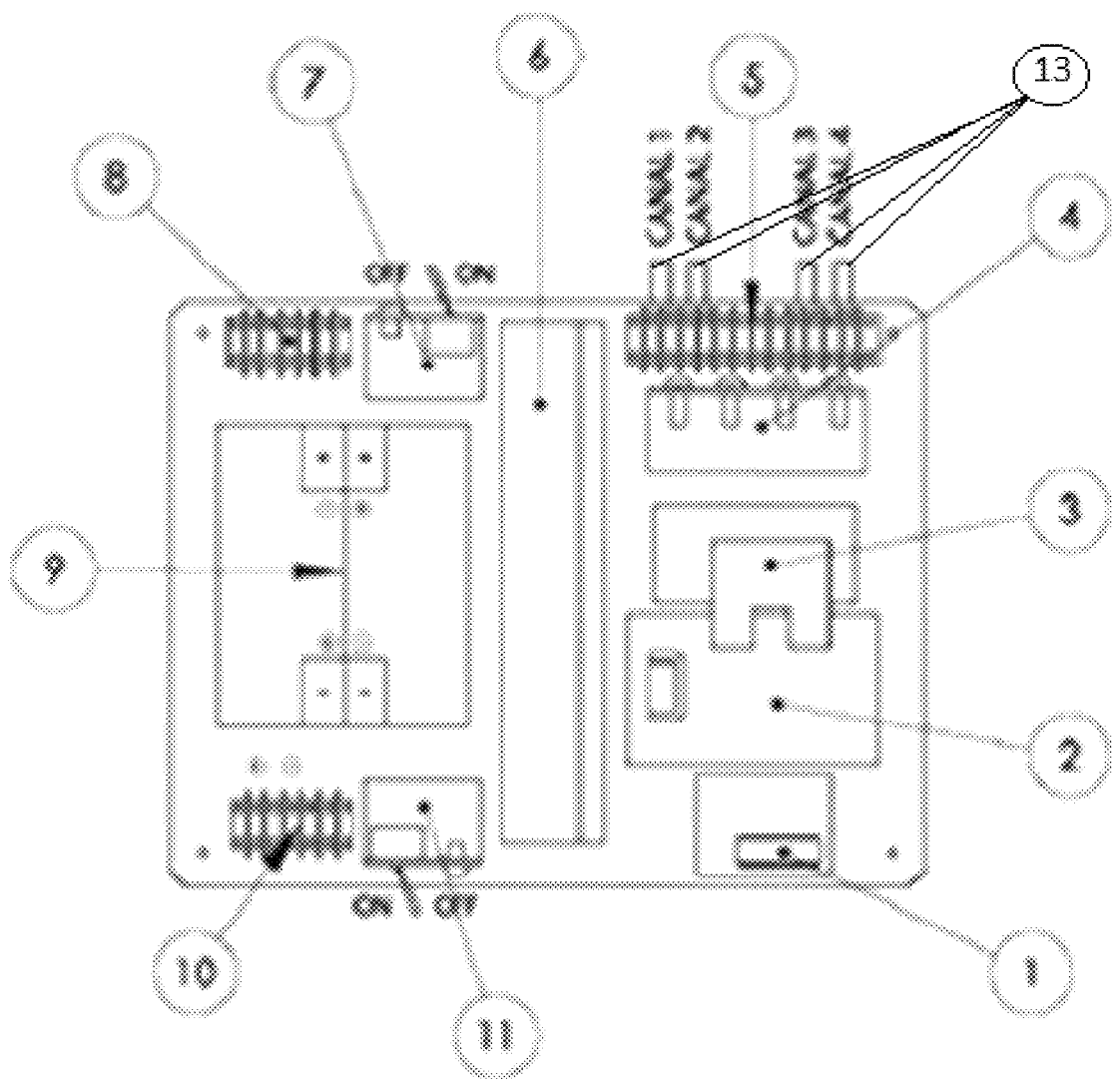
Figure 3:
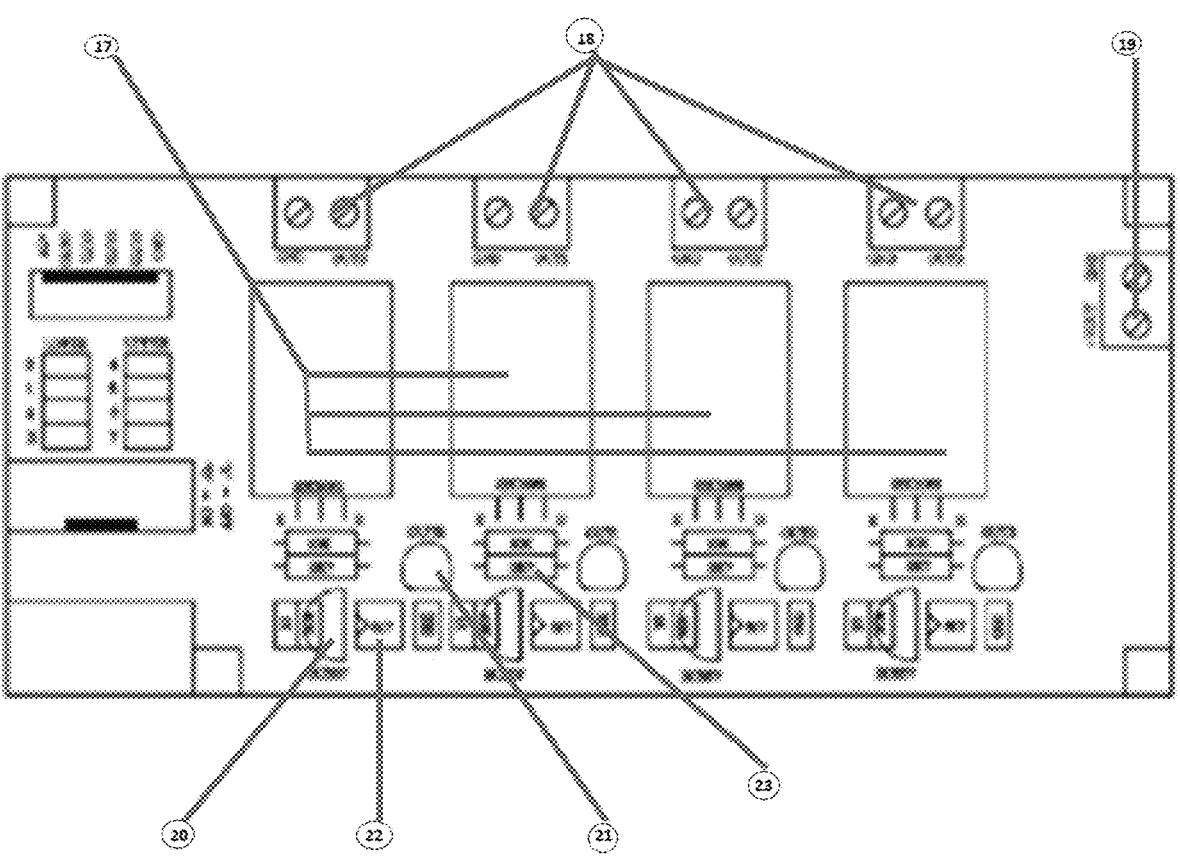
Figure 4:
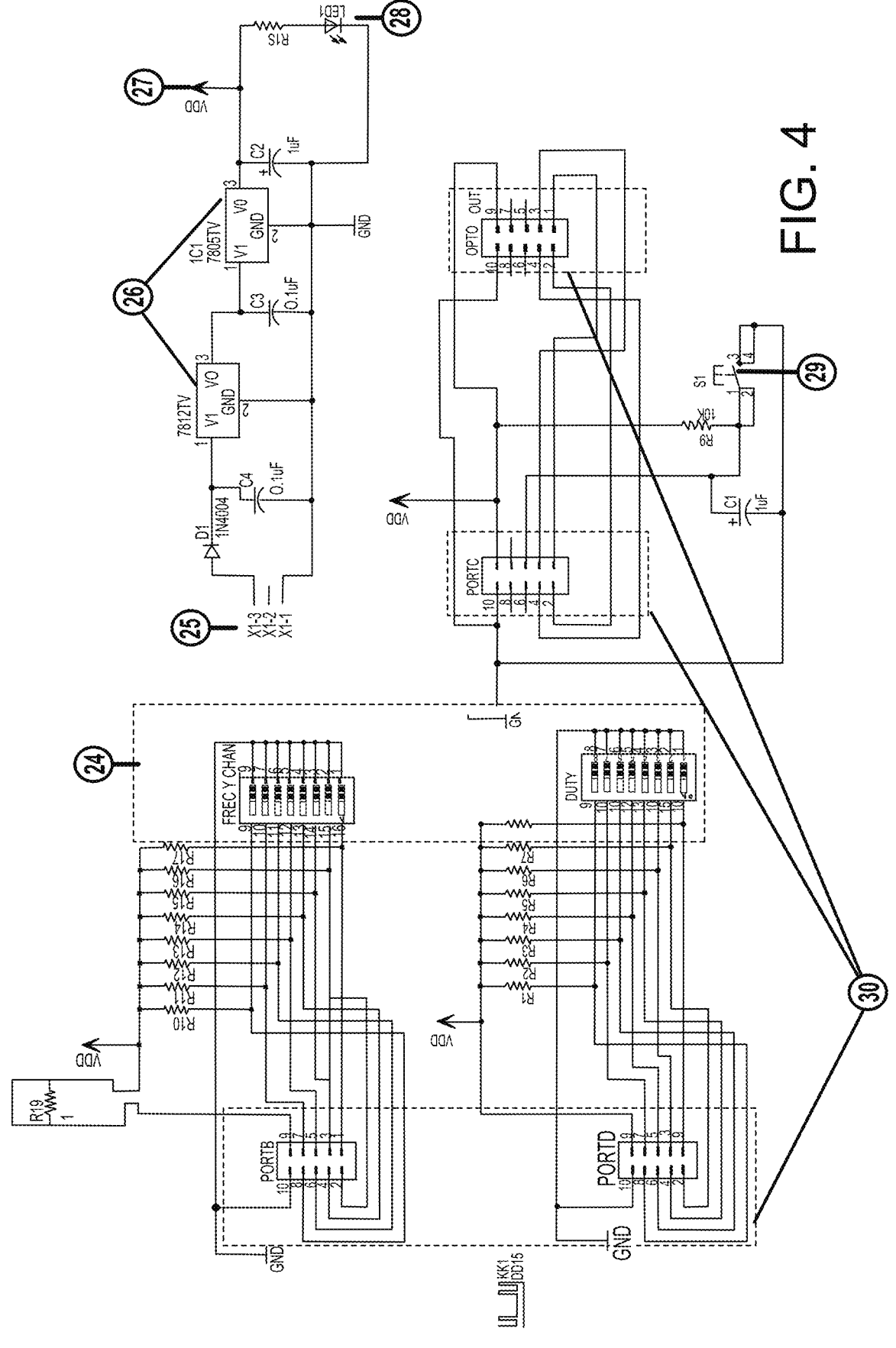

This figure describes the system described in this development, where the operating interactions of the different elements and devices that comprise the system can be seen in the following numbers. Two types of electrode distributions, and how they are separated when there are more than two according to the numbers, are also shown schematically:

(12) Conductive electrodes

(14) Treatment tank (or simply tank)

(15) Solid-state electronic device

(31) Foam outlet. An optional device to separate the flocs from the surface (16) may be associated with this outlet.

(32) Inlet of the liquid to be treated

(33) Treated liquid outlet

(34) Solids outlet

(35) Plastic bolt or spacer.

(36) Plastic nut

FIG. 2

This figure shows a diagram of the solid-state electronic device, where the numbers represent:

(1) Control module with microcontroller and peripherals

2) Voltage adaptation and programming module

3) Power module

4) Protections and output status indicators

5) Output channel terminal strip

6) Battery-backed power supply module

7) Power switch and input protection (220 VAC)

8) 220 VAC power terminal strip 9) 12 VDC/17AH batteries ×2

10) Battery bank terminal and protection strip

11) Battery bank protection circuit breaker

13) Electrode output channels

FIG. 3

This figure shows a schematic diagram of the power module (PCB) elements distribution, where the numerals represent:

(17) Power transistors

(18) Power output terminals

(19) Power supply source

(20) Command driver transistors (Driver) A

(21) Driver Transistors (Driver) B

22) Optocoupler

(23) Resistors

FIG. 4

This figure shows a distribution scheme of the functional programming module (2) and voltage adaptation elements, where the numerals represent:

(24) Programming Mini Dips

(25) Regulated direct current (DC) output

(26) Voltage Regulators

Figure 5:
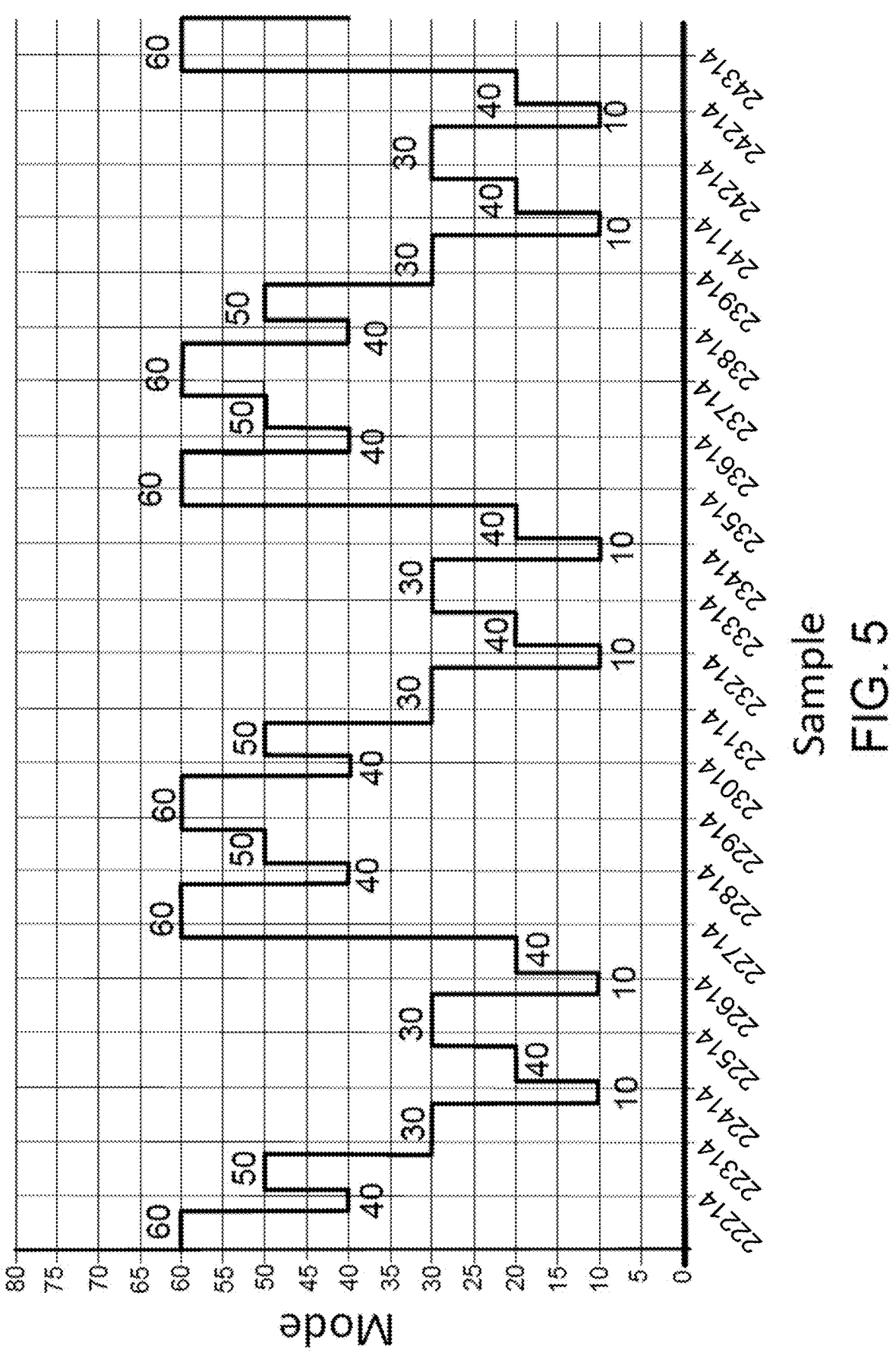
Figure 6:
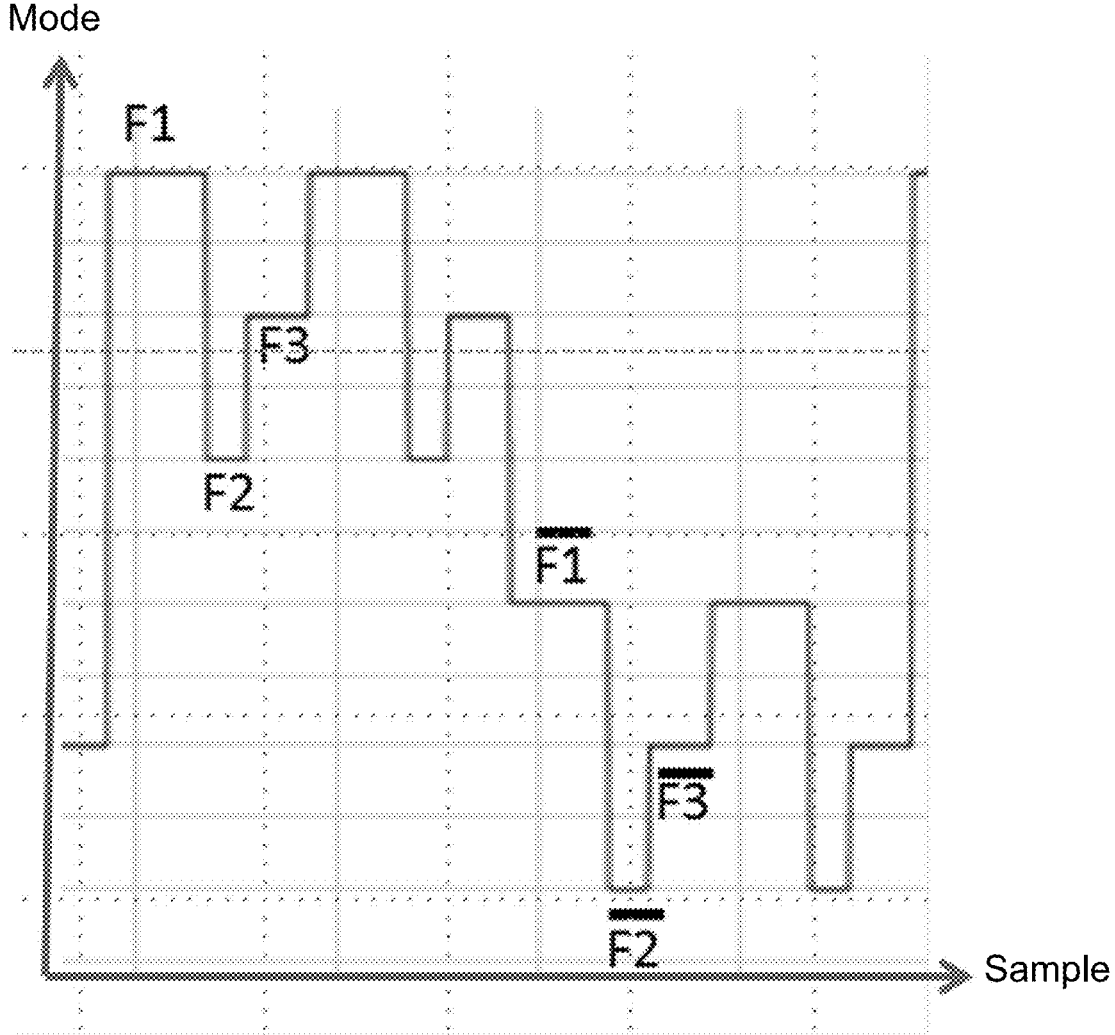

(27) Direct Current Power Supply
(28) LED light indicator
(29) Programming pushbutton
(30) Connectors
FIG. 5

This figure presents a mode diagram applied on different samples for the separation of liquids from solids, where modes 10, 20, 30, represent the phase inversion of the frequencies used, with respect to a reference value of 35. The modes are dimensionless values, where each mode has a dynamic frequency associated with it. If one analyzes the diagram one can see that the mode sequence "10, 20, (phase reversal) 60, 40, 50, 60, 40, 50, (in phase) 30, 10 (phase reversal)" is repeated continuously throughout the diagram; this is because this sequence corresponds to one of the six basic operating processes of the system.

FIG. 6

This figure shows a zoom of FIG. 5/9, where one can specifically see the basic process given by the mode sequence "10, 20, 60, 40, 50, 50, 60, 40, 50, 30, 10". Where modes 10, 20, and 30 correspond to a phase reversal, as opposed to modes 40, 50, and 60, which occur in phase, where:

F1 is in phase and its corresponding phase inversion is F1 on superscript,
F2 is in phase and its corresponding phase inversion is F2 on superscript,
F3 is in phase and its corresponding phase inversion is F3 on superscript,
mode 1 follows the following scale 10 pattern,
mode 2 follows the following scale 20 pattern,
mode 3 follows the following scale 30 pattern,
mode 4 follows the following scale 40 pattern,
mode 5 follows the following scale 50 pattern,
mode 6 follows the following scale 60 pattern.

FIG. 7

This figure provides a graphical representation of the duty cycles on a sample, where the modes are related to their respective micro-impulses and samples per second.

FIG. 8

Figure 7:
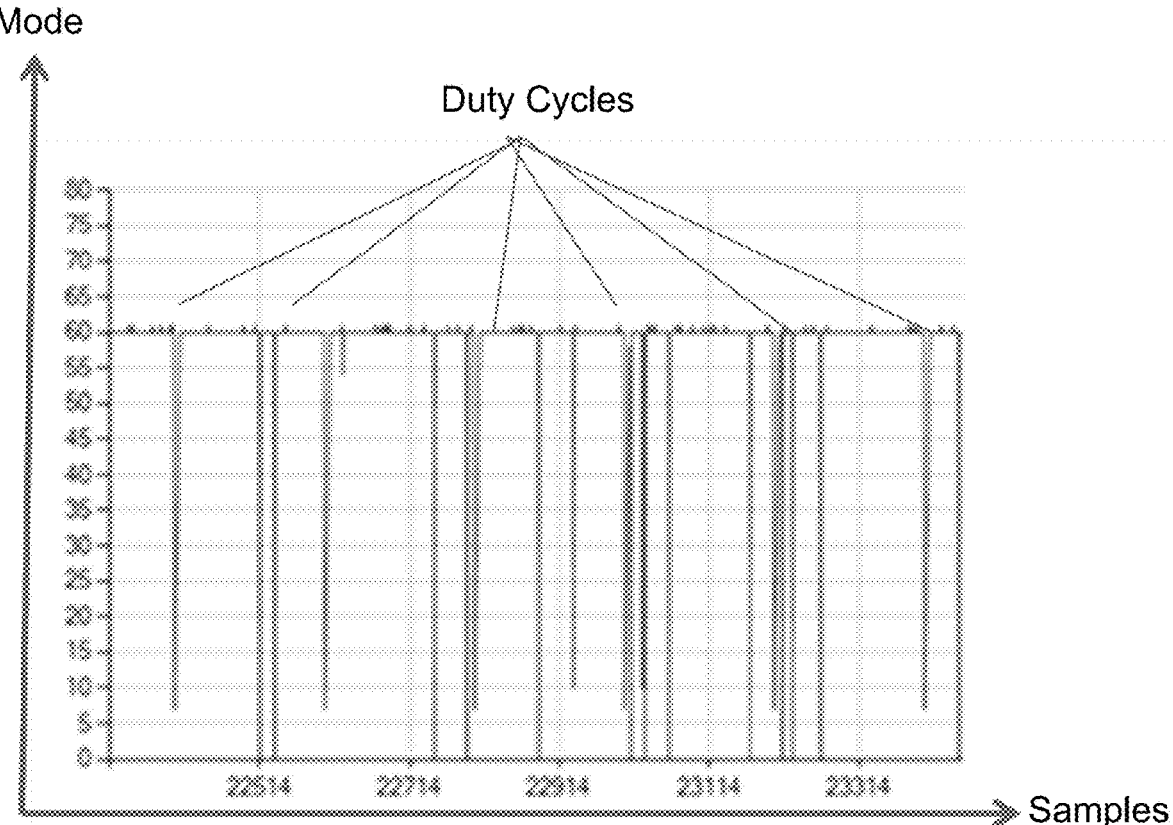
Figure 8:
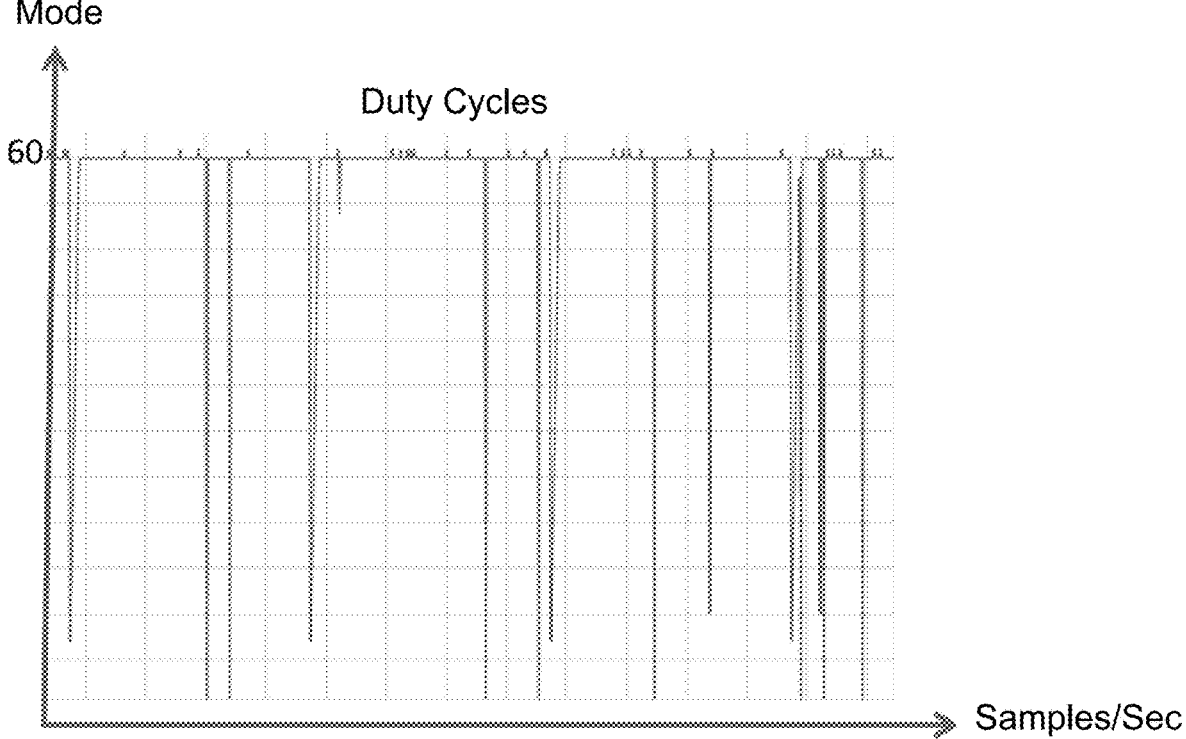
Figure 9:
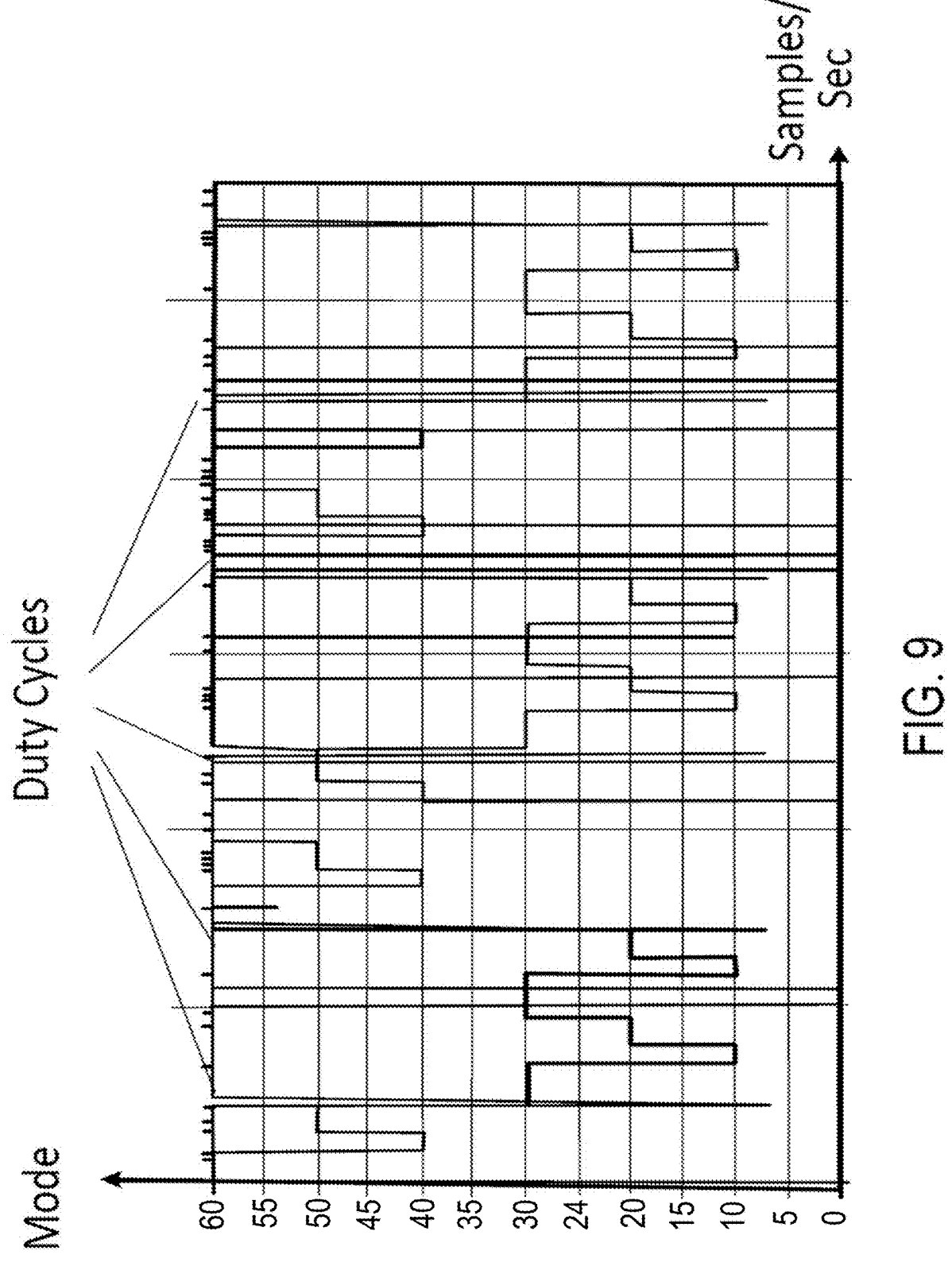

This figure zooms in on a section of the graph in FIG. 7/9, where mode 60 is clearly visible.

FIG. 9

This figure presents the integration between the mode diagram and the associated duty cycle diagram, showing the ratio produced in a given duty cycle with regard to the mode used at that time. Note that there are different duty cycles for the same mode, which correspond to different substances present in the liquid to be treated. This means that there will be different duty cycles automatically fed back from the temperature and current measurements and their analysis using the control algorithm.

Implementation Example

Example of liquid industrial waste (LIW) treatment 1

This test was conducted with dairy food industry effluents in 1 cubic meter tanks (EBC), with four aluminum electrodes located at the corners of the tank. Sampling for laboratory analysis was performed in the first third from the base of the tank along one of its lateral faces. Temperature was measured with an infrared thermometer, total dissolved solids (TDS) were measured with a sedimentation cone (laboratory), COD (chemical oxygen demand, also in the laboratory) and pH with a pH std. meter, and conductivity was delivered continuously by the developed system. The tests were performed by external laboratory Eurofins GCL under national sanitary regulations DS 90, DS 46, and DS 609 for liquid waste.

Sampling was performed over time and the results were observed as shown in Table I below:

TABLE I

| Tank test analysis dairy effluent LIW 1000 L. 4 Electrodes | | | | | | |
|---|---|---|---|---|---|---|
| Sample | COD | pH | TDS | Conduct. | Time Start Time | Minutes Treatment |
| 1 | 5090 | 10.7 | 1430 | 5280 | 10.36 | 0 |
| 2 | 5060 | 10.6 | 1560 | 4510 | 11.00 | 15 |
| 3 | 4800 | 10.4 | 1530 | 4430 | 11.30 | 30 |
| 4 | 4390 | 10.1 | 1540 | 3810 | 12.45 | 105 |
| 5 | 4190 | 9.9 | 1540 | 3810 | 13.30 | 150 |
| 6 | 4140 | 9.8 | 1610 | 3780 | 14.15 | 175 |
| 7 | 3770 | 9.7 | 1620 | 3670 | 15.00 | 220 |

The results of this experience clearly show that after 220 minutes of treatment, the chemical oxygen demand (COD) is reduced by approximately 26%, the pH remains relatively constant even though it is acidified by one point, and the total dissolved solids (TDS) increase by 13% because they are agglomerating or electro-coagulating in the treated liquid. On the other hand, conductivity decreases by approximately 31%, thus confirming the lower amount of dissolved substances that conduct electricity.

Example of liquid industrial waste (LIW) treatment 2

This test was conducted using effluents from a fruit canning company in 1 cubic meter tanks (EBC), with four aluminum electrodes located at the corners of the tank. Sampling for laboratory analysis was performed in the first third from the base of the tank along one of its lateral faces. Temperature was measured with an infrared thermometer, total dissolved solids (TDS) were measured with a sedimentation cone (laboratory), COD (chemical oxygen demand, also in the laboratory) and pH with a pH std. meter, and conductivity was delivered continuously by the developed system. The tests were performed by external laboratory Eurofins GCL under national regulations DS 90, DS 46, and DS 609 for liquid waste.

Sampling was performed over time and the results were observed as shown in Table II:

TABLE II

| Tank test data analysis 1000 L. | | | | Fruit LIW |
|---|---|---|---|---|
| Sample | COD | REDUC COD % | Time Start time | Minutes Treatment |
| 1 | 4940 | 0 | 11.05 | 0 |
| 2 | 3500 | −29% | 12.00 | 55 |
| 3 | 1210 | −76% | 13.00 | 115 |
| 4 | 1080 | −78% | 14.00 | 175 |
| 5 | 850 | −83% | 15.00 | 235 |

The results of this experience clearly show how after 235 minutes of treatment, the chemical oxygen demand (COD) is reduced by approximately 83%.

Seawater Treatment Example

These tests were conducted using wastewater effluent from a seawater reverse osmosis plant in one cubic meter tanks (EBC), with half a cubic meter of sample and one cubic meter of sample. In addition, four aluminum electrodes located at the corners of the tank were used. Sampling for laboratory analysis was performed in the first third from the base of the tank along one of its lateral faces. Temperature was measured with an infrared thermometer, total dissolved solids (TDS) were measured with a sedimentation cone (laboratory), COD (chemical oxygen demand, also in the laboratory), the different counterions measured (chloride, nitrate, nitrate/nitrite ratio, and sulfate) were measured in the external laboratory, and pH was measured with a pH std. meter; conductivity was continuously delivered by the developed system. The tests were performed by external laboratory Eurofins GCL under national regulations DS 90, DS 46, and DS 609 for liquid waste.

Sampling was performed over time and the results were observed as shown in Table III:

Ratio, Chloride and Sulfate) and the ME31-MetOf (8) method for Total Dissolved Solids.

Electrolyte Solution Treatment Example

These tests were conducted using a low copper concentrate electrolytic solution obtained from one cubic meter tanks (EBC) in an electrowinning plant, with one cubic meter of sample. In addition, four tantalum-coated titanium electrodes located at the corners of the tank were used. Sampling for laboratory analysis was performed in the first third from the base of the tank along one of its lateral faces.

TABLE III

| Osmosis plant wastewater analysis | | | | |
|---|---|---|---|---|
| Test Date: 12 Sept. 2017 | | Test 500 Lts. LDM Equipment Ver 2.0 | | |
| Code 334-2017-00052123 | Raw Water | Treated Water | Difference | Difference |
| Chlorides | 182 | 151 | ↓ 31 | 83.0% |
| Nitrates | 40.8 | 36.7 | ↓ 4.1 | 90.0% |
| Nitrate/Nitrite Ratio | 0.82 | 0.73 | ↓ 0.09 | 39.0% |
| Total Dissolved Solids | 1255 | 1115 | ↓ 140 | 88.8% |
| Suifate (SO₄) | 351 | 294 | ↓ 57 | 83.8% |
| Test Date: 28 September 2017 | | Test 1000 Lts, LDM Equipment ver 2.0 | | |
| Code 334-2017-00054218 | Raw Water | Treated Water | Difference | Difference |
| Chlorides | 746 | 577 | ↓ 1.69 | 77.3% |
| Nitrates | 135 | 81.3 | ↓ 53.7 | 60.2% |
| Nitrate/Nitrite Ratio | 2.7 | 1.63 | ↓ 1.07 | 60.4% |
| Total Dissolved Solids | 3450 | 2820 | ↓ 680 | 81.7% |
| Suifate (SO₄) | 1675 | 949 | ↓ 726 | 56.7% |

The results shown in the upper table of this experiment (half a cubic meter of sample) clearly show that water already treated by reverse osmosis (raw water), but which does not achieve satisfactory sanitary levels for counterions or water hardness, upon being exposed to the present development for 120 minutes is able to reduce chloride levels by 17%, nitrates by 10%, the nitrite/nitrate ratio by 11%, TDS by 11.2% and sulfate by 16.2%.

The results of the lower table of this experiment (one cubic meter of sample) clearly show that water already treated by reverse osmosis (raw water), but which does not reach satisfactory sanitary levels for counterions or water hardness, upon exposure to the present development, is able Temperature was measured with an infrared thermometer, the different ions measured (antimony, bismuth, arsenic, selenium, copper, iron and Cl (HCl)) were measured in the external laboratory, pH was measured with a pH std. meter, and conductivity was delivered continuously by the developed system. The analyses were performed by external laboratory Eurofins GCL.

Continuous treatment was performed for 10 minutes and the states and color modification produced were observed, the results of which are shown in Table IV below:

TABLE IV

| | | Concentration (g/L) | | | | | | |
|---|---|---|---|---|---|---|---|---|
| PI No. | Process Solutions | Sb | Bi | As | Se | Cu | Fe | HCl |
| 11 | Original Acid CH, 30/11/18 | 34.91 | 1.76 | 7.50 | 0.03 | 1.15 | 0.22 | 252.61 |
| 11 | Electrocoag. Acid p1. 30/13/18 | 13.98 | 2.00 | 4.25 | 0.02 | 1.01 | 0.30 | 197.59 |
| | DOM - PRODUCTION CATHODE CHEMICAL ANALYSIS (BATCH No 3) | | | | | | | |

| | | Lows (%) | | | | | |
|---|---|---|---|---|---|---|---|
| PI No. | Electrowinning | Sb | Bi | As | Se | Cu | Fe |
| 11 | Solid Electrocoag. 30/11/18 | 30.40% | 2.57% | 21.49% | 0.02% | 1.92% | 0.06% | to reduce chloride levels by 22.7%, nitrates by 39.8%, the nitrite/nitrate ratio by 39.6%, TDS by 18.3% and sulfate by 43.3%.

The previously exposed minerals were measured using the 2007-MetAlt (19) IC method (Nitrate, Nitrate/Nitrite The results of the upper table of this experiment clearly show that the low copper concentrate electrolyte reduces the ions and elements dissolved in the copper, when this technology is applied: Sb (−60%), Bi (+12), As (−43.3%), Cu (−12.2%), Se (−33.3%), Fe (+36.4%) and HCl (−21.8%), when exposed to the present development for 10 minutes.

The results of the lower table of this experiment clearly show how the electro-coagulated deposit by the system was enriched in the different elements that were separated from the electrolyte.

With these results, this technology can be used to recover elements found in low concentrations in spent electrolytes (after the electrowinning process) or in percolated liquids from spent material piles to further optimize electrowinning.

In summary, it is clear that the application of the system in the reject water from a reverse osmosis plant and in liquid industrial waste achieves a marked decrease in pollutant parameters.

The invention claimed is:

1. A system for separating liquids and solids comprising a treatment tank in which at least two conductive electrodes are immersed at a ratio of 0.25 $m^2$ electrode surface area per cubic meter of tank capacity, the electrodes being connected to a solid-state electronic device the solid-state electronic device is connected to a power source and comprises an algorithm that controls the programming of the system and the conductive electrodes the solid-state electronic device being capable of generating electronic signals that are emitted by the electrodes at frequencies, between 1 Hz and 250 Hz, and their corresponding even subharmonics and wherein the liquid to be separated has a minimum conductivity of 2 mS/m wherein the solid-state electronic device comprises: a control module with microcontroller and peripherals in which the algorithm is stored and in which different oscillator frequencies are generated for each duty cycles of the system, where the operating frequency and duty cycle information are received from a voltage adaptive programming module, and where the trigger control signals to be used by a module are generated;

a battery-backed power supply module to supply energy to the modules, and in which current is transformed from alternating current to direct current, a battery is to supply energy to all the modules, a programming and voltage adaptation module, wherein different operation modes are programmed externally without accessing a microcontroller through integrated programming switches, and wherein voltages required for operation of the microcontroller are developed, adapted, and the power supply providing the trigger signals to a power module;

the power module connected to the conductive electrodes, and having at least four independent channels mounted on a terminal strip, wherein each channel has a set of transistors activated by signals generated by an integrated control element and adapted through programming and voltage adaptation module, where signals from the power module are isolated from the integrated control element, and the power module has an optical isolation function through optocouplers; and an algorithm to control the different modules, wherein the system generates energy pulses of less than 2 milliseconds within each duty cycle and wherein the system operates under six programs that are integrated and related to each other, and the algorithm performs a frequency inversion.

2. A system for separating liquids and solids with a minimum conductivity, according to claim 1, WHEREIN the conductive electrodes comprise conductive materials selected from the group consisting of metallic, ceramic, composite and polymeric materials the electrodes are positioned inside the treatment tank at a height from a base of the tank of between 5 cm to 25 cm, and at a distance from the tank walls of between 10 cm to 50 cm.

3. A system for separating liquids and solids, according to claim 1, WHEREIN the treatment tank comprises is one or more containers, for holding a volume of liquid from 0.1 cubic meters to 1 million cubic meters for processing, batch form, and wherein the containers include at least one member selected from the group consisting of cylindrical, rectangular, irregular and conical shapes that conforms-to the ground where the containers are placed, and the tank also comprises inlet-outlet for treated foam, a solids outlet and optionally a surface floc extraction device.

4. A system for separating liquids and solids with minimum conductivity, according to claim 1, WHEREIN the system operates with variable duty cycles, fed back by the current measured at the conductive electrodes.

5. The system of claim 2 wherein the electrodes comprise a member selected from the group consisting of aluminum, titanium, stainless steel, ruthenium, and tantalum.

6. The system of claim 2 wherein the electrodes comprise a titanium core coated with tantalum.

7. A procedure for operating a system for separating liquids and solids according to claim 1 with minimum conductivity, comprising the following stages:

a) filling the treatment tank with the liquid to be separated up to a spill-proof safety edge;

b) measuring the pH, temperature, and conductivity of the liquid to be separated;

c) Integrating the previously measured pH, temperature, and conductivity into the algorithm and defining a cycle and modes to be applied to the microcontroller and the programming module through analog and digital inputs;

d) activating the solid-state electronic device that provides frequencies in the range of 1 Hz to 250 Hz, in different operating modes and wherein the different modes are assigned according to:

i) measured current flowing through the electrodes;

ii) voltage applied to each mode; and iii) temperature of the liquid to be separated, and wherein the solid-state electronic device sweeps through the different modes, and current pulses are produced within each mode thereby generating larger flocs capable of being separated;

e) forming precipitated and/or coagulated solids for extraction from the target liquid;

f) forming bubbles pushing the electro-flocculate to the surface of the tank;

g) removing the electro-flocculated solid to the surface of the tank, leaving the clean liquid; and h) phase inversion of the frequencies on the electrodes.

* * * * *